Inventor:
Otto Möller

Patented Mar. 3, 1931

1,795,092

UNITED STATES PATENT OFFICE

OTTO MÖLLER, OF WEDEL, GERMANY, ASSIGNOR TO THE FIRM OF CARL ZEISS, OF JENA, GERMANY

SYSTEM OF REVERSING PRISMS

Application filed June 28, 1928, Serial No. 288,865, and in Germany June 18, 1926.

The present invention relates to an image-reversing system of prisms affording parallel vision, in which only two ray-traversing surfaces are exposed to the air, and in which there is only one roof surface and two single totally reflecting surfaces, thus dispensing with any silvering.

If a prism-system of the said kind is developed in such a way as to have one of the two single reflecting surfaces border one of the two ray-traversing surfaces at a re-entering angle, if further such prism-system consists of two glass bodies cemented to each other, with the position of the cemented surface being such as to contain that particular edge upon which the vertex of the said angle lies, and if the said roof surface is so disposed as to be the last reflecting surface struck by a ray traversing the prism, an advantage is attained over the aforementioned types of prism-systems, which are well known, in that the distance from each other of the two ray-traversing surfaces may be kept small, this being an important factor, particularly if the prism-system be applied to field-glasses.

It is convenient to distribute the reflecting surfaces amongst the two glass bodies in such a manner as to have one glass body contain only the roof, and the remaining glass body only the two single reflecting surfaces. Therefore, it is preferable that only one of the two ray-traversing surfaces be assigned to each one of the two glass bodies.

A particular advantage is attained if the angle of inclination of the roof towards the ray-traversing surfaces be kept rather small, lying between, say, 8 and 22°. In this way it is possible to obtain prism forms in which each of the two glass bodies protrudes beyond the ray-traversing surface of the other, in a perpendicular direction to the ray-traversing surfaces, thus preventing a direct transview through the two ray-traversing surfaces, and the formation, therefore, of disturbing reflections.

Figure 1:
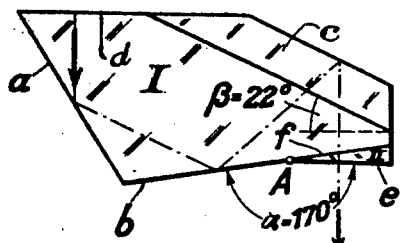

In Figs. 1 to 7 of the annexed drawing there are shown in principal section, seven prism-systems as in accordance with the invention.
The prism-system in Fig. 1 contains two single totally reflecting surfaces $a$ and $b$, and a roof $c$. The ray-traversing surface $d$ lies parallel to the ray-traversing surface $e$. The latter surface together with the adjacent reflecting surface $b$ forms a re-entering angle $\alpha=170°$, while the angle $\beta$, which is embraced by the edge of roof $c$ and by the aforesaid two ray-traversing surfaces $d$ and $e$, is 22°. By a plane $f$, containing the vertex A of the said angle $\alpha$, the prism-system is separated into parts I and II to be cemented together. The position of the plane $f$ is such, as to make part I of the prism-system contain the roof $c$, in addition to the two single reflecting surfaces $a$ and $b$.

Figure 2:
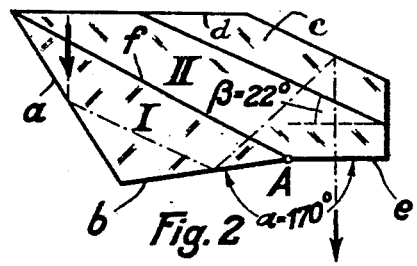
Figure 3:
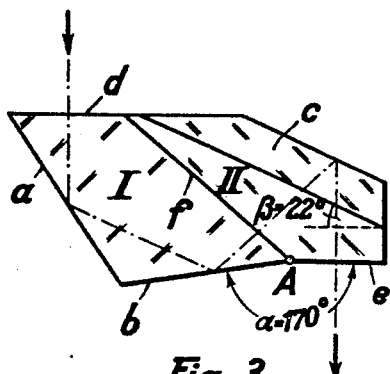

The prism-systems shown in Figs. 2 and 3 merely differ from the one shown in Fig. 1 by the different position of the plane $f$ dividing each prism-system into two parts.

In Fig. 2 the two reflecting surfaces $a$ and $b$ belong to part I and the roof to part II, whereby the plane $f$, as in Fig. 1, passes through the vertex A of the said angle $\alpha$, and whereby both ray-traversing surfaces $d$ and $e$ lie in part II.

In Fig. 3 each one of the parts I and II only contains one of these two surfaces, i. e., part I the ray-entering surface $d$, and part II the ray-exit surface $e$. The plane $f$, as in Figs. 1 and 2, passes through the vertex A of said angle $\alpha$, and the reflecting surfaces $a$ and $b$, as in Fig. 2, belong to part I, while the roof $c$ belongs to part II.

All of the prism-systems shown in Fig. 4 to Fig. 7 correspond with Fig. 3 and differ in substance only by the size of angles $\alpha$ and $\beta$.

Figure 4:
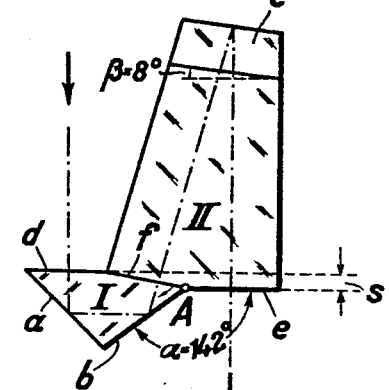
Figure 5:
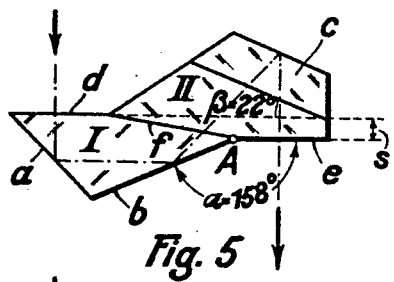

In Fig. 4 $\alpha=142°$ and $\beta=8°$, while in Fig. 5 $\alpha=158°$ and $\beta=22°$. In both prism-systems the mutual distance $s$ of the two ray-traversing surfaces $d$ and $e$ is comparatively small.

Figure 6:
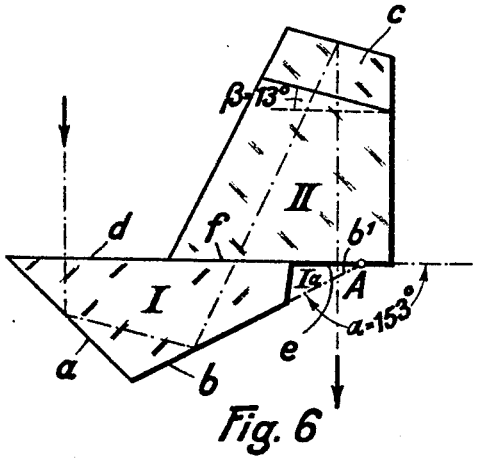

In prism-systems Fig. 6 $\alpha=153°$ and $\beta=13°$. The ray-entering surface $d$ and the ray-exit surface $e$ lie in the plane $f$ in which the parts I and II meet each other. Of part I, piece I$a$ containing ineffective part $b^1$ of the reflecting surface $b$ is cut away.

Figure 7:
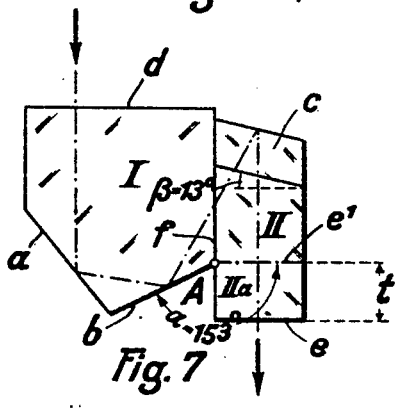

In prism-system Fig. 7, as in Fig. 6, $\alpha=153°$ and $\beta=13°$. The plane $f$ is perpendicular to the two ray-traversing surfaces $d$ and $e$. The construction of part II is such that a part II$a$ protrudes at thickness $t$ beyond that surface $e^1$ which embraces the angle $\alpha$ with the reflecting surface $b$.

I claim:

Reversing prism consisting of two parts cemented together and containing two ray-traversing surfaces which are parallel to each other, a roof surface and two non-silvered single reflecting surfaces, the plane of one of these two latter surfaces forming on the prism with the plane of one of the said ray-traversing surfaces a re-entering angle, the cemented surface passing through the line of intersection of the said two planes, and the said roof surface being the last reflecting surface struck by a ray traversing the prism.

OTTO MÖLLER.